US00RE39654E

(19) United States
(12) Reissued Patent
Huet

(10) Patent Number: US RE39,654 E
(45) Date of Reissued Patent: May 29, 2007

(54) OBTURATOR FOR AN OPENING PRODUCED IN A METAL SHEET

(75) Inventor: Laurent Huet, Meru (FR)

(73) Assignee: I.T.W. de France, Beauchamp (FR)

(21) Appl. No.: 10/864,918

(22) Filed: Jun. 10, 2004

Related U.S. Patent Documents

Reissue of:
(64) Patent No.: 6,557,208
Issued: May 6, 2003
Appl. No.: 09/791,916
Filed: Feb. 26, 2001

(30) Foreign Application Priority Data

Feb. 28, 2000 (FR) ..... 0002456

(51) Int. Cl.
*F16L 5/00* (2006.01)
*B65D 39/00* (2006.01)

(52) U.S. Cl. ..... 16/2.1; 220/233; 220/787; 220/789

(58) Field of Classification Search ..... 16/2.1, 16/2.2; 220/233, 787, 789, DIG. 19; 217/108, 217/110, 113; 174/65 R, 65 G, 153 G, 152 G, 174/152 R; 138/89
See application file for complete search history.

(56) References Cited

U.S. PATENT DOCUMENTS 3,900,130 A * 8/1975 Andrews et al.
4,227,625 A * 10/1980 Underwood ..... 215/358
4,938,378 A * 7/1990 Kraus ..... 220/789
4,961,836 A * 10/1990 Murphy ..... 208/111.15
6,211,464 B1 * 4/2001 Mochizuki et al. ..... 16/2.1
6,240,597 B1 * 6/2001 Mochizuki ..... 16/2.1

FOREIGN PATENT DOCUMENTS

| | | | |
|---|---|---|---|
| DE | 31 39 968 A | * | 4/1983 |
| DE | 39 02 500 A | * | 8/1990 |
| EP | 0970878 | | 1/2000 |
| FR | 2 395 203 A | * | 1/1979 |
| GB | 1/354 973 A | * | 6/1974 |

* cited by examiner

*Primary Examiner*—Chuck Y. Mah
(74) *Attorney, Agent, or Firm*—Lowe Hauptman & Berner, LLP

(57) ABSTRACT

An obturator (1) for an opening (10) has a collar (2) comprising a peripheral lip (3) adapted to come into abutment on a face (10a) of the opening (10), and several teeth (6) mounted pivotally on the collar (2) and adapted to come into abutment on an opposite face of the opening (10) in a locked position of the obturator (1). The teeth (6) are also fixed to a flange (12) mounted pivotally on a pusher (8), the pusher (8) being adapted to pivotally move the flanges (12) between an unlocked position and a locked position of the obturator (1). The obturator is used notably for sealing closing an opening in a motor vehicle body.

18 Claims, 1 Drawing Sheet

OBTURATOR FOR AN OPENING PRODUCED IN A METAL SHEET

Matter enclosed in heavy brackets [ ] appears in the original patent but forms no part of this reissue specification; matter printed in italics indicates the additions made by reissue.

FIELD OF THE INVENTION

The present invention concerns an obturator for an opening produced in a metal sheet, used notably in motor vehicle manufacture.

BACKGROUND

This type of obturator is used to close, in a sealed manner, openings produced in steel or aluminium structures, for example a motor vehicle body.

Such an obturator generally has a collar which provides the seal on the contour of the opening which is closed off.

This collar comprises on the one hand a peripheral lip adapted to come to bear, in a sealed manner, on a face of the periphery of the opening. This collar also comprises locking elements adapted to come into abutment on an opposite face of the opening when the obturator is in its locked position.

These locking elements can consist of a series of teeth which are adapted to pivot on the periphery of the opening.

SUMMARY OF THE INVENTION

The purpose of the present invention is to propose an obturator which is both simple and reliable to mount, procuring a good seal whatever the thickness of the structure to be closed off.

The obturator to which the invention relates has a collar comprising a peripheral lip adapted to come to bear on a face of the opening, and at least one tooth mounted pivotally on the collar and adapted to come into abutment on an opposite face of the opening in a locked position of the obturator.

In accordance with the invention, said at least one tooth is also fixed to a flange mounted pivotally on a central portion forming a pusher, this central portion forming a pusher being adapted to move said flange pivotally between an unlocked position and a locked position of the obturator.

Thus the movement of the central portion forming a pusher causes the pivoting of the flange and consequently the pivoting of the locking tooth and fixed to this flange.

The cam principle thus obtained allows, when the obturator is pushed in and the central portion forming a pusher moves axially, a free pivoting movement of the locking teeth so as to ensure the fitting of the obturator in the opening.

According to a preferred characteristic of the invention, said at least one tooth and said flange are substantially parallel to an axis of movement of the central portion forming a pusher in the unlocked position of the obturator and are oblique with respect to said axis of movement in the locked position of the obturator.

Thus the flange and associated tooth extend in line with the central portion forming a pusher so that they do not interface with the insertion of the obturator in the unlocked position in the opening.

According to another preferred characteristic of the invention, in the locked position, the pivoting point of said flange on the central portion forming a pusher extends beyond the pivoting point of said tooth on the collar along the axis of movement of the central portion forming a pusher.

By virtue of this arrangement, the tooth is maintained in firm abutment against the opposite face of the opening.

According to an advantageous characteristic of the invention, the flange is mounted pivotally on the central portion forming a pusher by means of a portion of material with a small flexible thickness.

Likewise, said at least one tooth is pivotally mounted on the collar by means of a second portion of material with a small flexible thickness.

It is thus possible to produce the points of articulation of the flange on the central portion forming a pusher and of the tooth on the collar by moulding of the obturator from a plastics material.

According to another preferred characteristic of the invention, the collar comprises a cylindrical ring, several regularly spaced teeth being mounted pivotally on the cylindrical ring.

Several locking points are thus created between the peripheral lip and the different teeth regularly distributed on the collar, consequently ensuring a reliable holding of the obturator in the opening.

In a preferred version of the present invention, the central portion forming a pusher and the collar include complementary locking means adapted to maintain the central portion forming a pusher in a position retracted within the collar in said locked position of the obturator.

These complementary locking means afford a positive locking of the obturator, in addition to the locking obtained by the cooperation of the peripheral lip on the collar and the different teeth.

The maintaining of the central portion forming a pusher in a retracted position in the collar limits the protrusion formed by the obturator in the locked position on the structure.

The obturator can be a trim part, visible for example in a motor car passenger compartment.

According to a practical embodiment of the invention, the collar comprises a peripheral rim provided with an internal peripheral groove, a locking element joined to the central portion forming a pusher being able to be deformed elastically by said rim before being maintained in abutment in said groove.

The locking of the central portion forming a pusher inside the collar is obtained automatically at the end of travel of the central portion forming a pusher when the obturator is fitted in an opening.

In addition, the elastic deformation of the locking element when the peripheral rim passes procures a locking click which constitutes an audible signal for the operator, thus guaranteeing him a correct positioning of the obturator.

According to a preferred embodiment, the central portion forming a pusher has an annular locking flange adapted to come into abutment in said peripheral groove in the collar.

This annular locking flange thus procures for the obturator an additional seal between the central portion forming a pusher and the collar.

BRIEF DESCRIPTION OF THE DRAWINGS

Other particularities and advantages of the invention will also emerge in the following description.

In the accompanying drawings, given by way of non-limitative examples.

DETAILED DESCRIPTION OF THE DRAWINGS

Figure 1:
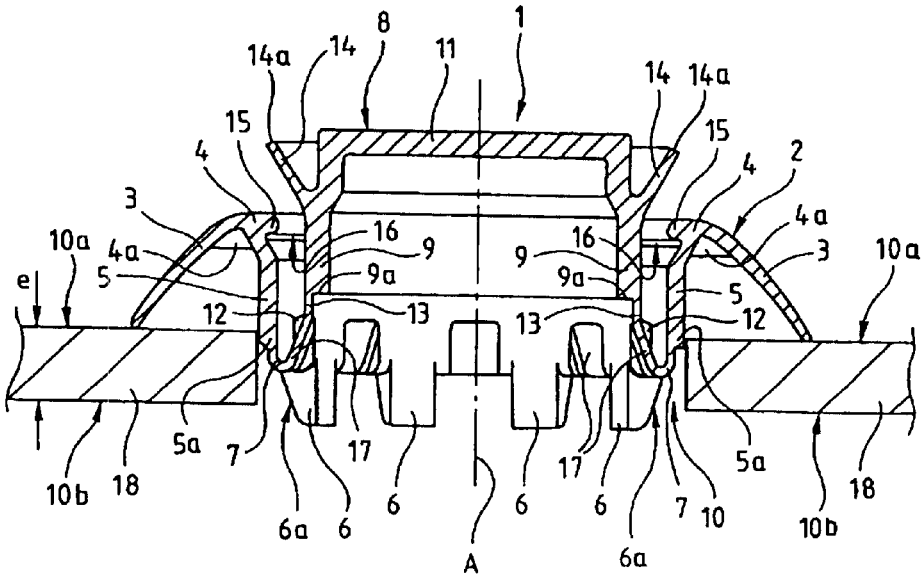
FIG. 1 is a view in longitudinal section of an obturator in the unlocked position.

A description will be given of an obturator according to one embodiment of the invention with reference to FIG. 1.

This obturator 1 is used to sealingly close off openings, generally circular, produced in sheets or plates made of steel or aluminium, for example motor vehicle bodies.

These openings are generally formed in metallic structures whose thickness can vary within a wide range of dimensions, typically from 0.7 mm to 3 mm.

Here it is a case of a circular opening 10, produced in a plate 18.

The obturator 1 comprises a collar 2 which has a peripheral lip 3 adapted to come to bear sealingly on a face 10a of the opening 10.

This peripheral lip 3 is relatively fine and elastically deformable.

In this example, the peripheral lip 3 forms a frustoconical surface adapted to come into abutment on a contour of the opening 10.

The collar 2 also has a thickness portion 4, circular in shape, at the top of the peripheral lip 3.

This circular portion 4 is preferably stiffened by virtue of the presence of ribs 4a extending inside the collar 2, between the peripheral lip 3 and this thicker area 4.

The collar 2 also comprises a cylindrical ring 5, in line with the circular portion 4, and which extends on the same side as the peripheral lip 3 from this circular ring 4.

This cylindrical ring 5 forms a relatively rigid wall whose diameter is adapted to the diameter of the opening to be closed off 10.

More precisely, the diameter of this cylindrical ring 5 is substantially equal to the diameter of the opening to be closed off 10.

The different elements of this collar 2, that is to say the peripheral lip 3, the circular portion 4 and the cylindrical ring 5, are concentric, with an axis common with the longitudinal axis A of the obturator.

The obturator 1 also has a series of teeth 6.

In this example, and in no way limitatively, the obturator has six teeth regularly spaced apart around the longitudinal axis A of the obturator.

Each tooth is pivotally mounted on the collar 2, and more precisely at the end 5a of the cylindrical ring 5, that is to say the end opposite to the circular portion 4 of the collar 2.

In order to ensure the articulation of each tooth 6 on the cylindrical ring 5, a hinge area 7 connects each tooth 6 to this cylindrical ring 5.

More precisely, the teeth 6 are mounted on the cylindrical ring 5 of the collar 2 by means of a ring 7 made of flexible thin material.

This flexible ring 7 is also concentric with the collar 2.

Each tooth 6 has a wall 6a adapted to come into contact with an opposite face 10b of the opening in the locked position of the obturator 1, this wall 6a forming an inclined plane with respect to the longitudinal axis A of the obturator 1.

More precisely, this wall 6a forms an inclined plane whose lowest point, in the elevation view in FIG. 1, is situated towards the inside of the obturator 1.

The teeth 6 thus have substantially a trapezoidal shape.

The obturator 1 also comprises a central portion 8 referred to as a pusher in the remainder of the description.

This pusher 8 has a hollowed-out cylindrical shape.

More precisely, in this example, it is formed by a cylindrical wall 9 closed at one end by a substantially flat wall 11 forming an abutment surface for moving the pusher 8.

The cylindrical ring 5 of the collar 2 and the pusher 8 are concentric, the cylindrical ring 5 thus defining a guidance orifice for the pusher 8.

Each tooth 6 is also fixed to a flange 12 which is pivotally mounted on the pusher 8, or more precisely on the free end 9a of the cylindrical wall 9 of the pusher.

As before, for mounting the tooth 6 pivotally on the collar 2, each flange 12 is pivotally mounted on the pusher 8 by means of a portion 13 of thin flexible material.

In this example embodiment, where several flanges 12 associated respectively with the teeth 6 are mounted on the pusher 8, this hinge area 13 is formed by a ring made of flexible thin material 13.

In other words, the teeth 6 are fixed to the central portion forming a pusher 8 by means of a ring made of flexible thin material 7 which comprises thicker portions in line with the teeth 6, these thicker portions being adapted to form flanges 12, themselves pivotally mounted at the hinges area 13 on the pusher 8.

Thus, as clearly illustrated in FIG. 1, each tooth 6 and each associated flange 12 are substantially parallel to the longitudinal axis A of the obturator corresponding to the axis of movement A of the pusher 8 when the obturator is in its unlocked position.

In addition, the pusher 8 has an annular locking flange 14.

In this example, this annular flange 14 forms a frustoconical surface splayed towards the top 11 of the pusher.

The collar 2 also has a peripheral rim 15 substantially at the circular portion 4.

This peripheral rim 15 is provided with an internal peripheral groove 16. The diameter of the circle formed by the free end 14a of the annular flange 14 is slightly greater than the diameter of the circle formed by the peripheral edge 15 of the collar 2.

The whole of this obturator can be produced from plastics material, by moulding.

A description will now be given of the operation of such an obturator 1, notably with reference to FIG. 2.

This obturator is adapted to sealingly close the opening 10 whatever the thickness e of the plate 18.

As illustrated in FIG. 1, the obturator 1 is first of placed in the opening 10 so that the teeth 6 pass through this opening 10 and the cylindrical ring 5 of the collar is positioned in contact with the edge of the opening 10.

By virtue of the inclined wall 6a of each tooth, the obturator is easily placed in the opening 10.

Once the obturator has been prepositioned in the opening 10, a pressure is exerted on the pusher 8 so that the collar 2, and more precisely its peripheral lip 3, comes to bear on the face 10a of the opening 10.

The peripheral lip 3 is thus deformed until the reinforcing ribs 4a on the circular portion 4 come into contact with the contour of the opening 10.

The pusher 8, which is in projection from the collar 2 in the unlocked position of the obturator 1, moves in the orifice formed by the cylindrical ring 5 on the collar 2, along the axis of movement A.

When the pusher 8 travels towards the inside of the opening 10, this pusher causes each flange 12 to pivot about the hinge area 13, and then consequently each tooth 6 about the hinge area 7.

Figure 2:
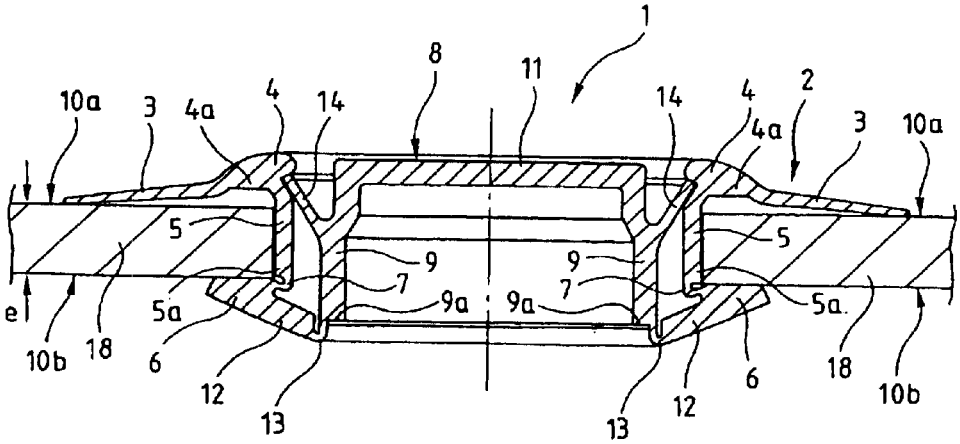
FIG. 2 is a view in longitudinal section of the obturator of FIG. 1, in the locked position and pivoted by 30° about its longitudinal axis.

Thus, in the locked position of the obturator as illustrated in FIG. 2, the teeth 6 and associated flanges 12 are oblique with respect to the axis of movement A of the pusher 8.

This oblique position of the tooth 6 under the contour of the opening is notably obtained by virtue of the inclined wall 6a of the tooth 6 adapted to come into abutment on the face 10b of the this opening 10.

More precisely, the pivoting point at the hinge area 13 of each flange 12 on the pusher 8 extends beyond the pivoting point at the hinge area 7 of each tooth 6 on the collar 2, in the direction of pushing in of the pusher 8 along the axis of movement A.

Thus a locking of the obturator in position in the opening 10 is obtained.

Thus, when the pusher 8 travels inside the cylindrical portion 5 of the collar 2, the annular flange 14 is elastically deformed at the rim 15 of the collar 2 before being returned inside the peripheral groove 16 which maintains this annular flange 14 in abutment and prevents the pusher 8 from projecting from the collar 2.

The locking is thus provided at the end of travel of the pusher 8 when the annular flange 14 is in position in the groove 16.

In addition, by virtue of the elastic deformation of this annular flange 14, a locking click occurs when the peripheral rim 15 passes, which signals to the operator that the obturator is correctly in place in the opening 10.

When the pressure on the pusher 8 is released at the end of travel, an elastic return effect is provided by the peripheral lip 3 so that the teeth 6 are pressed against the face 10b of the opening.

The teeth 6, thus tilted under the peripheral of the opening 10, provide the bracing of the plate 18 whatever its thickness e.

The seal at the obturator is thus ensured whatever the thickness of the plate in which the opening 10 is produced.

Removal of the obturator is possible with the use of a suitable tool, for example a screwdriver.

In practice, the tip of the tool is engaged between the annular flange 14 and the groove 16 in order to make the pusher 8 emerge from the collar 2 by a lever arm movement and a rotation of the tip of the tool about the annular flange 14.

The obturator 1, thus unlocked, resumes its initial position as illustrated in FIG. 1 in order to be removed by hand and possibly reused.

Thus an obturator is obtained which can be locked audibly and visibly simply by pushing in the pusher 8, which finds a good closure seal whatever the thickness of the plate, and which can possibly be reused.

Naturally, many modifications can be made to the example described above without departing from the scope of the invention.

Thus the number and distribution of the teeth on the obturator can be modified, the number of teeth being for example able to be between two and twelve.

Moreover, the locking means consisting of the annular flange 14 and the peripheral groove 16 of the collar 2 can be different.

For example, the annular flange 14 can be replaced by one or more discrete flanges forming several locking elements around the longitudinal axis A of the obturator.

What is claimed is:

[1. An obturator for sealing an opening formed in a plate having opposite faces, said obturator having locked and unlocked positions and comprising:

a collar having a peripheral lip adapted to come into abutment on one of the faces of the plate;

at least one tooth adapted to come into abutment on the other face of the plate in the locked position of said obturator; and a central portion forming a pusher and adapted to move said tooth pivotally from the unlocked position to the locked position of said obturator;

wherein said tooth is pivotally attached to said collar and said pusher by first and second connecting portions, respectively; and said pusher has an upper end and a lower end, said pusher being closed by a transverse wall at the upper end and being attached to said tooth via said second connecting portion at the lower end.]

2. The obturator according to claim [1] *11*, wherein said tooth is substantially perpendicular to [an] *the central* axis [of movement] of said pusher in the unlocked position of said obturator, and is oblique with respect to said axis [of movement] in the locked position of said obturator.

3. The obturator according to claim [1] *11*, wherein, in the locked position, the second connecting portion is at an elevational level below the first connecting portion with respect to said collar.

4. The obturator according to claim [1] *11*, wherein the second connecting portion is made of a flexible material having a thickness smaller than that of said tooth and *that of* said pusher.

5. The obturator according to claim 4, wherein said obturator is entirely made of a molded material.

6. The obturator according to claim [1] *11*, wherein the first connecting portion is made of a flexible material having a thickness smaller than that of said tooth and *that of* said collar.

7. The obturator according to claim [1] *11*, wherein the collar further comprises a substantially cylindrical ring, said at least one tooth comprises several regularly spaced teeth pivotally attached to said cylindrical ring.

[8. The obturator according to claim 1, further comprising two complementary locking elements formed on said pusher and said collar, respectively, said locking elements being adapted to maintain said pusher retracted within said collar in the locked position of said obturator.]

[9. The obturator according to claim 8, wherein said locking elements produce an audible sound while engaging each other.]

[10. The obturator according to claim 1, wherein said pusher is movable in an axial direction between an upper position corresponding to the unlocked position of said obturator and a lower position corresponding to the locked position of said obturator.]

11. [The obturator according to claim 10,] *An obturator for sealing an opening formed in a plate having opposite faces, said obturator having locked and unlocked positions and comprising:*

*a collar having a peripheral lip adapted to come into abutment on one of the faces of the plate;*

*at least one tooth adapted to come into abutment on the other face of the plate in the locked position of said obturator; and*

*a central portion forming a pusher and adapted to move said tooth pivotally from the unlocked position to the locked position of said obturator;*

*wherein said tooth is pivotally attached to said collar and said pusher by first and second connecting portions, respectively;*

*wherein said pusher has an upper end and a lower end, said pusher being closed by a transverse wall at the upper end and being attached to said tooth via said second connecting portion at the lower end;*

*wherein said pusher is movable along a central axis of said obturator between an upper position corresponding to the unlocked position of said obturator and a lower position corresponding to the locked position of said obturator; and* wherein said tooth has a wedge shape defined by [two] *first and second* major surfaces [converging] *which, in the unlocked position, converge* towards each other in a direction away from said pusher, wherein in the unlocked position, [one of said] *the first* major surface[s] extends obliquely with respect to the [axial direction] *axis, away from the pusher and toward the axis* so as to facilitate introduction of said obturator in the opening; and in the locked position, said *first* major surface extends substantially perpendicular to the [axial direction] *axis*.

12. The obturator according to claim [1] *11*, wherein said pusher is a hollow tubular member being closed at the upper end by said transverse wall and open at the lower end that is attached to said tooth.

13. An obturator for an opening formed in a plate having opposite faces, said obturator having locked and unlocked positions and comprising:

a collar having a peripheral lip adapted to come into abutment on one of the faces of the plate;

at least one tooth adapted to come into abutment on the other face of the plate in the locked position of said obturator; and a central portion forming a pusher and adapted to move said tooth pivotally from the unlocked position to the locked position of said obturator;

wherein said tooth is pivotally attached to both of said collar and said pusher; and said tooth is pivotally attached to [at least one of] said [pusher and] collar by means of a flexible ring having a thickness smaller than that of said tooth *and that of said collar*.

14. The obturator according to claim 13, wherein said pusher is movable in an axial direction between an upper position corresponding to the unlocked position of said obturator and a lower position corresponding to the locked position of said obturator.

[15. The obturator according to claim 13, wherein the thickness of said flexible ring is smaller than that of the at least one of said pusher and collar.]

16. The obturator according to claim 13, wherein said obturator is entirely made of a molded material.

17. An obturator for an opening formed in a plate having opposite faces, said obturator having locked and unlocked positions and comprising:

a collar having a peripheral lip adapted to come into abutment on one of the faces of the plate;

at least one tooth adapted to come into abutment on the other face of the plate in the locked position of said obturator; and a central portion forming a pusher and adapted to move said tooth pivotally from the unlocked position to the locked position of said obturator;

wherein said tooth is [pivotally] attached to both of said collar and said pusher; and said collar further comprises a peripheral rim provided with an internal peripheral groove, said pusher being provided with a locking element elastically deformable by said rim, during a movement of said pusher form the unlocked position to the locked position, before being maintained in abutment in said groove when said obturator is in the locked position.

18. The obturator according to claim 17, wherein said locking element comprises an annular locking flange that is received in said peripheral groove when said obturator is in the locked position.

19. The obturator according to claim 18, wherein said annular locking flange defines a frustoconical surface splayed towards [a] an upper end of said pusher, said pusher further comprising a lower end that is attached to said tooth.

20. The obturator according to claim 17, wherein said pusher is movable in an axial direction between an upper position corresponding to the unlocked position of said obturator and a lower position corresponding to the locked position [[]f] *of* said obturator.

*21. The obturator according to claim 17, wherein said tooth is pivotally attached to said pusher.*

*22. The obturator according to claim 17, wherein said tooth is pivotally attached to both said pusher and said collar.*

*23. The obturator according to claim 11, wherein the second major surface in the unlocked state is substantially parallel to the axis.*

* * * * *